United States Patent
Yoshida et al.

(10) Patent No.: US 6,994,644 B2
(45) Date of Patent: *Feb. 7, 2006

(54) TENSIONER

(75) Inventors: Osamu Yoshida, Osaka (JP); Hiroshi Hashimoto, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 189 days.

This patent is subject to a terminal disclaimer.

(21) Appl. No.: 10/620,753

(22) Filed: Jul. 16, 2003

(65) Prior Publication Data

US 2004/0029664 A1   Feb. 12, 2004

(30) Foreign Application Priority Data

Aug. 12, 2002 (JP) ............................. 2002-234829

(51) Int. Cl.
*E16H 7/08* (2006.01)
(52) U.S. Cl. ...................................... 474/110; 474/117
(58) Field of Classification Search ............... 474/101, 474/109, 110, 111, 113, 117, 135, 137, 140
See application file for complete search history.

(56) References Cited

U.S. PATENT DOCUMENTS

| 6,244,981 | B1 * | 6/2001 | Simpson | 474/110 |
| 6,612,408 | B2 * | 9/2003 | Serkh et al. | 188/129 |
| 6,808,466 | B2 * | 10/2004 | Yoshida et al. | 474/110 |
| 2003/0236144 | A1 * | 12/2003 | Seungpyo | 474/110 |
| 2004/0029666 | A1 * | 2/2004 | Yoshida et al. | 474/111 |

FOREIGN PATENT DOCUMENTS

| GB | 2 389 404 A | 12/2003 |
| JP | 2003184970 A | 7/2003 |

* cited by examiner

Primary Examiner—Vicky A. Johnson
(74) Attorney, Agent, or Firm—Howson and Howson

(57) ABSTRACT

In a chain tensioner comprising a plunger having toothed racks engageable with wedge-shaped cams which cooperate with oblique cam-guiding surfaces, the cam-guiding surfaces are formed on a cam-receiving ring disposed in an enlarged part of the cam-receiving hole adjacent the front end of the tensioner housing, and axially movable, through a limited distance, in a space between a shoulder and a seal cap. The axially movable cam-receiving ring increases both the minimum and maximum backlash distances of the plunger, thereby making it possible for the tensioner to accommodate different chain conditions by changing the axial dimensions of the cam-receiving ring, or the space in which it moves, instead of, or in addition to, modifying the angle of the cam-guiding surfaces.

2 Claims, 7 Drawing Sheets

TENSIONER

FIELD OF THE INVENTION

This invention relates to a tensioner for maintaining proper tension in an endless, flexible, power transmitting medium such as a drive chain or drive belt. The tensioner has utility, for example, in maintaining tension in the timing chain of an internal combustion engine, where the chain transmits power from a crankshaft sprocket to one or more camshaft sprockets.

BACKGROUND OF THE INVENTION

In a conventional tensioner, a plunger, protruding from a housing, exerts a force on the back of a pivoted tensioner lever having a shoe in sliding contact with the slack, or return, run of a chain in order to maintain tension in the chain. The plunger of the tensioner engages the lever at a location remote from the pivot axis of the lever.

One form of conventional chain tensioner 500, as shown in FIG. 10, comprises a plunger 520, which protrudes retractably from a plunger-receiving hole 511 in a housing 510. A biasing spring 530, biases the plunger 520 in the protruding direction. Wedge-shaped cams 540, in the form of cam chips, slide on oblique guide surfaces 512 formed in grooves the open front end of the plunger-receiving hole 511. These cams have teeth which engage racks 521 formed on opposite sides of the plunger 520. At least two such cams are provided. A cam-biasing spring 550, loosely fitting on the plunger 520, biases the wedge-shaped cams 540, pushing them axially against the guide surfaces so that they are urged, toward the plunger axis, into the plunger-receiving hole 511. The outer end of the cam-biasing spring 550 bears against an inwardly projecting flange of a spacer 560 secured to the front end of the housing 510.

As a chain elongates during use, the chain tensioner 500 controls backlash by allowing the plunger 520 to proceed sequentially, one tooth at a time, in the projecting direction. In this way, the tensioner maintains appropriate chain tension, and prevents foreign noise upon starting of the engine, and whistling sounds which occur as a result of excessive chain tension.

In a prior chain tensioner 500, the backlash distance was controlled in the design process, by selecting an appropriate angle of inclination for the cam-guiding surfaces 512, which determine the direction of movement of the wedge-shaped cams 540.

However, determining the backlash distance by selection of the angle of inclination of the cam-guiding surfaces gave rise to several problems. That is when the angle of inclination of the cam guide surfaces 512, measured between the guide surfaces and the plunger axis, is decreased excessively to increase the backlash distance, the wedging action of the cams 540 becomes excessive, and the cams and plunger are liable to lock together so that disengagement between the cams and the plunger does not occur. Chipping of teeth also occurs due to wear and insufficient strength of the teeth of both the cams 540 and the racks 521.

On the other hand, when the angle of inclination of the cam guide surfaces 512 is increased excessively in order to reduce the backlash distance, the wedging action of the wedge-shaped cams 540 is impaired. Movement of the cams, on the cam-guiding surfaces 512, into the plunger-receiving hole 511 becomes unreliable, and disengagement is liable to occur due to the unreliability of the movement of the cams.

Therefore, when the backlash distance is determined solely by the angle of inclination of the cam-guiding surfaces 512, the backlash distances are limited to an very narrow range by restrictions such as tooth strength and the like, which need to be considered in designing the plunger racks and cams. Accordingly, tensioners of this kind have not been suitable for all types of engines.

For chain tensioners of the type described, a variety of housings with cam-guiding surfaces inclined at different angles corresponding to the desired backlash distances must be made available. Furthermore, because the guide surface inclinations vary, different wedge-shaped cams must be provided for each of the housings. Parts control was difficult, especially since the wedge-shaped cams are small in size, and cams having different angles of inclination are difficult to distinguish from one another. As a result, in the assembly of these chain tensioners, the wrong wedge-shaped cams were sometimes installed.

Accordingly, objects of the invention are to solve the above-described problems; to provide a tensioner in which the backlash distances required for various engines can be set easily in order to prevent foreign wobbling sounds and other chain noises upon starting of an engine, and to prevent whistling sounds due to excess tensioning of the chain; to maintain appropriate tension over a wide range without limitation; and to achieve a significant improvement in the durability of the backlash mechanism.

SUMMARY OF THE INVENTION

The tensioner in accordance with the invention comprises a housing having a plunger-receiving hole. The hole has an opening at its front end, a plunger-receiving part having a first diameter, and a widened portion adjacent the front end, having a diameter wider than the first diameter. A shoulder is recessed from the front end and faces toward the front end of the hole. A plunger having a longitudinal axis fits slidably into the plunger-receiving hole and protrudes axially from the opening thereof. The plunger has an external surface with longitudinally extending, toothed racks formed thereon. A protrusion biasing spring biases the plunger in the protruding direction. The plunger extends through a cam-receiving ring, located in the widened portion of the hole and has an oblique cam-guiding surface sloping in the direction of protrusion of the plunger and outward from the axis of the plunger. A ring-biasing spring, biases the cam-receiving ring in the direction of protrusion of the plunger. A plurality of wedge-shaped cams, which slide on the oblique cam-guiding surface of the cam-receiving ring, are releasably engageable with the racks on the plunger. A cam-biasing spring biases he cams in the direction opposite to the direction of protrusion of the plunger. A seal cap on the housing, has a cap opening through which the plunger extends axially, and cooperates with the widened portion of the hole to provide an enclosure containing the ring-biasing spring, the cam-receiving ring, the wedge-shaped cams, and the cam biasing spring. The seal cap has an inside end surface surrounding the cap opening, and the cam-receiving ring is disposed between the inside end surface of the seal cap and the shoulder, and movable axially therebetween.

The term "maximum backlash distance N" refers to the total distance through which the plunger travels in the retracting direction, from a position immediately preceding the position at which, after the cams have ascended the slopes of the oblique cam guide surface, the engagement between the cams and the racks of the plunger is released, to the position in which the plunger returns to the farthest retracted position permitted by the cams. The term "minimum backlash distance M" refers to the total distance through which the plunger travels when returning from the position immediately following the position at which the cams disengage the rack teeth and step by one tooth, to the farthest retracted position permitted by the cams.

If the minimum backlash distance of the plunger is M, the maximum backlash distance is N, the maximum displacement of the cam-receiving ring is S, the return distance of the plunger due to displacement of the cams from a position immediately preceding the position at which they step over one tooth of the racks is n, and the return distance of the plunger due to displacement of the cams from a position immediate following the position at which they step over one tooth of the racks is m, the dimensions of the racks of the plunger, the wedge-shaped cams, and the cam-receiving ring are preferably selected to satisfy the relationships M=m+S and N=n+S.

The oblique cam guide surfaces in the chain tensioner of the invention may take any shape provided that the wedge-shaped cams can smoothly ascend and descend on the cam guide surface in accordance with the extending and retracting motion of the plunger. However, if an angle of inclination of the cam guide surfaces, measured with respect to the protruding direction of the plunger, is defined as θ, it is preferable that the inclination of the cam guide surfaces be set so that 15°<θ<70°. When the angle of the cam guide surfaces is less than 15°, the tooth heads of the cams can easily engage the tooth heads of the racks, and chipping of the teeth, or excessive rocking, are liable to occur. When the angle of the cam guide surfaces is larger than 70°, movement of the cams becomes sluggish, and the wedging action of the cams on the plunger becomes unreliable.

The invention is applicable both to an "inner mounting" tensioner in a sealed condition inside an engine, and to an "outer mounting" tensioner mounted outside an engine.

The protrusion biasing spring may be provided at any of a variety of positions, for example, between the front end of the plunger and the seal cap, or between the rear end of the plunger and the bottom of the plunger-receiving hole.

The protrusion biasing spring can exert a larger biasing force than the biasing springs for the cams or the cam-receiving ring. The biasing spring for the cam-receiving ring can exert a larger biasing force than the cam-biasing spring, which biases the wedge-shaped cams in a direction opposite to the protruding direction of the plunger.

Furthermore, the tensioner in accordance with the invention is applicable not only to a timing chain transmitting power from a crankshaft sprocket to one or more camshaft sprockets, but also to other chains, such as a chain in a balancer system, or a drive chain in an oil pump system. Furthermore, the tensioner of the invention can be also applied to a drive belt.

As a chain becomes elongated during engine operation, an appropriate backlash distance is maintained because the plunger proceeds in the protruding direction one tooth at a time relative to the cam teeth. Accordingly, appropriate chain tension is maintained, and foreign sounds on engine start-up, and whistling sounds generated during excessive tensioning of the chain, are prevented.

In the operation of the tensioner, when the chain in which tension is being maintained becomes loose, the plunger is rapidly moved in the protruding direction by the plunger biasing spring. When the plunger moves forward, the cam-receiving ring, which is initially in contact with the shoulder in the widened part of the plunger-receiving hole, is also displaced in the protruding direction by the biasing force exerted by the ring-biasing spring. As the cam-receiving ring is displaced forward, the wedge-shaped cams being biased by the cam-biasing spring are also displaced in the protruding direction.

When the cam-receiving ring moves forward, and comes into abutment with the inside end surface of the seal cap, it stops there, and the cams can then slide forward and outward on the oblique cam-guiding surface of the cam-receiving ring. If the plunger moves a sufficient distance in the protruding direction, the cam teeth disengage the rack teeth of the plunger. Since the cam-biasing spring is in contact with the inside end surface of the seal cap, at the moment when the engagement between the cams and the racks of the plunger is released, the cams slide inward and rearward on the cam guide surfaces of the cam-receiving ring until they re-engage the racks of the plunger at positions shifted by one tooth.

When the plunger is pushed back by an external force exerted by the chain, the cam-receiving ring is displaced in the retracting direction, together with the cams, until it abuts on the shoulder in the widened part of the plunger-receiving hole of the housing. At the same time, the wedging action of the cams blocks further retraction of the plunger.

The external retracting force exerted on the plunger is dispersed uniformly by the wedge-shaped cams in components directed in oblique directions on opposite sides of the plunger.

DETAILED DESCRIPTION OF THE PREFERRED EMBODIMENTS

Figure 1:
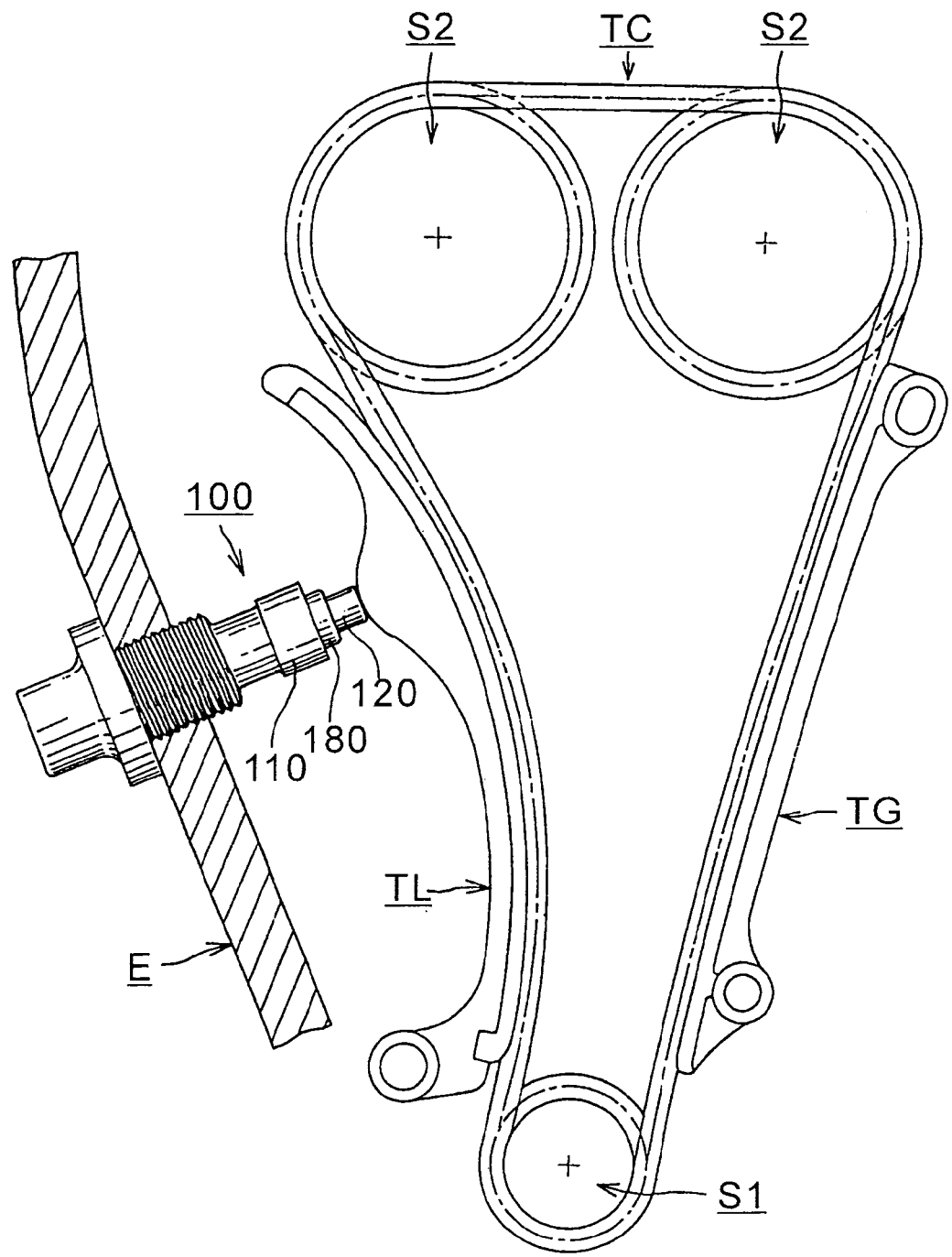
FIG. 1 is an elevational view of a timing transmission of an internal combustion engine, showing how a tensioner according to the invention maintains tension in a timing chain.

The tensioner 100, as shown in FIG. 1, is used as an outer attachment type chain tensioner, to maintain tension in, and suppress the vibration generated during the traveling of, a timing chain TC, trained between a crankshaft sprocket S1 and camshaft sprockets S2 of a vehicle engine. In the chain tensioner 100, a spring-biased plunger 120 protrudes toward the timing chain TC. The chain travels in front of the tensioner housing 110, which is attached to an engine block wall E. The plunger presses the back surface of a tensioner lever TL, pivotally supported on the engine block, urging a shoe surface of the tensioner lever TL into sliding contact with the slack side of the timing chain TC to impart tension to the chain.

A tensioner guide TG, which is fixed to the engine block, guides the timing chain TC to prevent the chain from wobbling.

Figure 2:
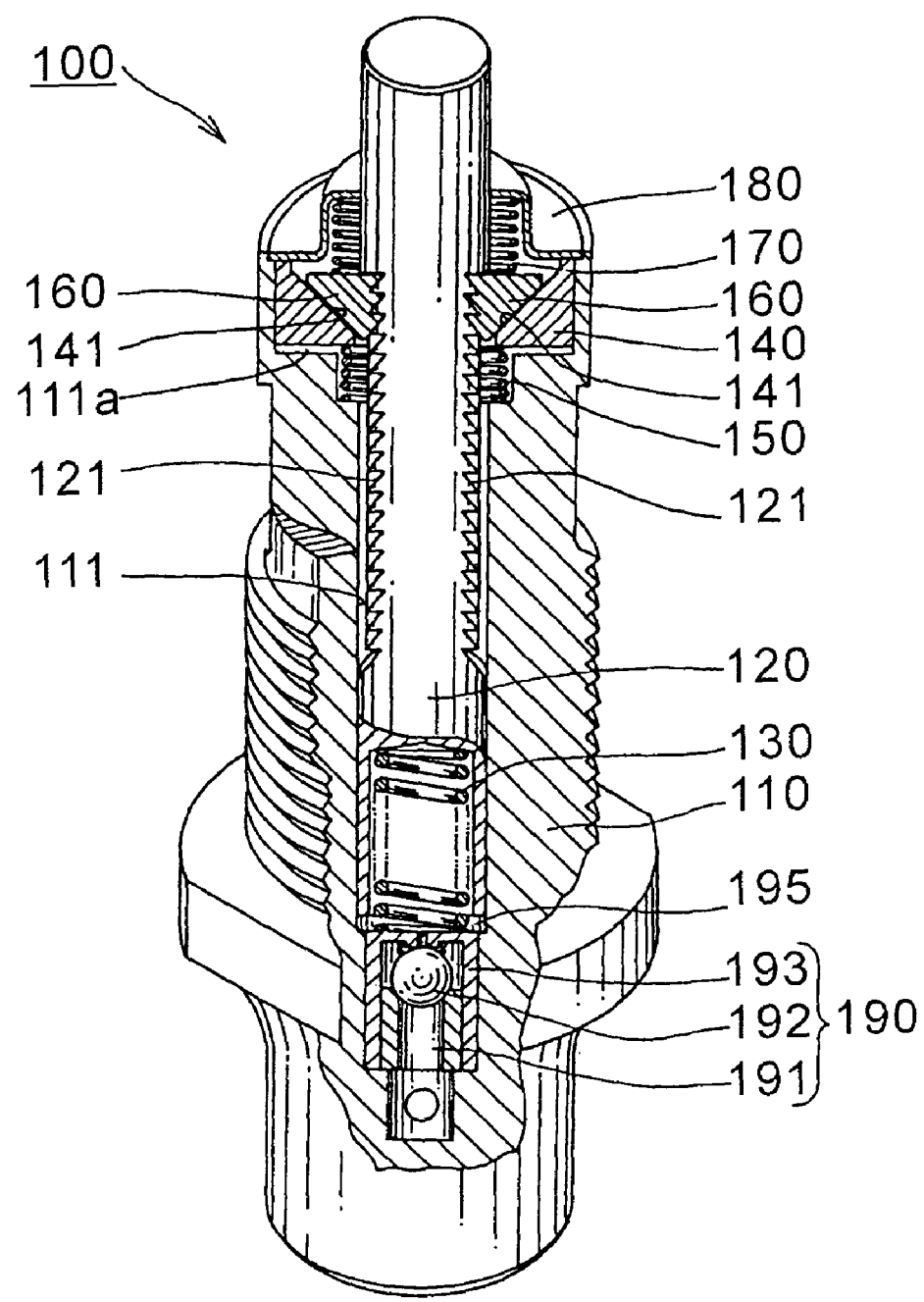
FIG. 2 is a perspective view, partly in section, of the tensioner shown in FIG. 1.
Figure 3:
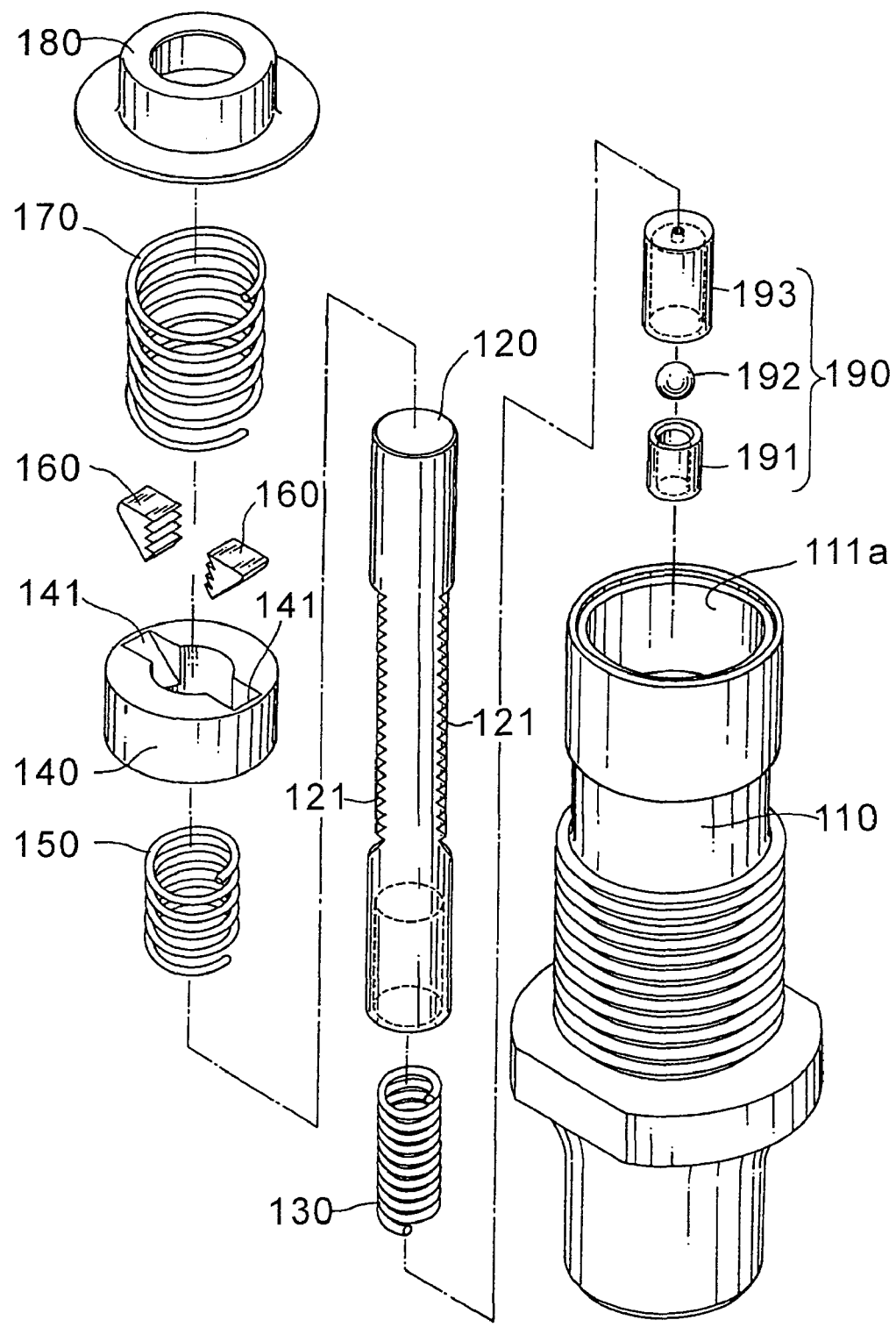
FIG. 3 is an exploded perspective view showing the assembly of the tensioner of FIG. 1.
Figure 4:
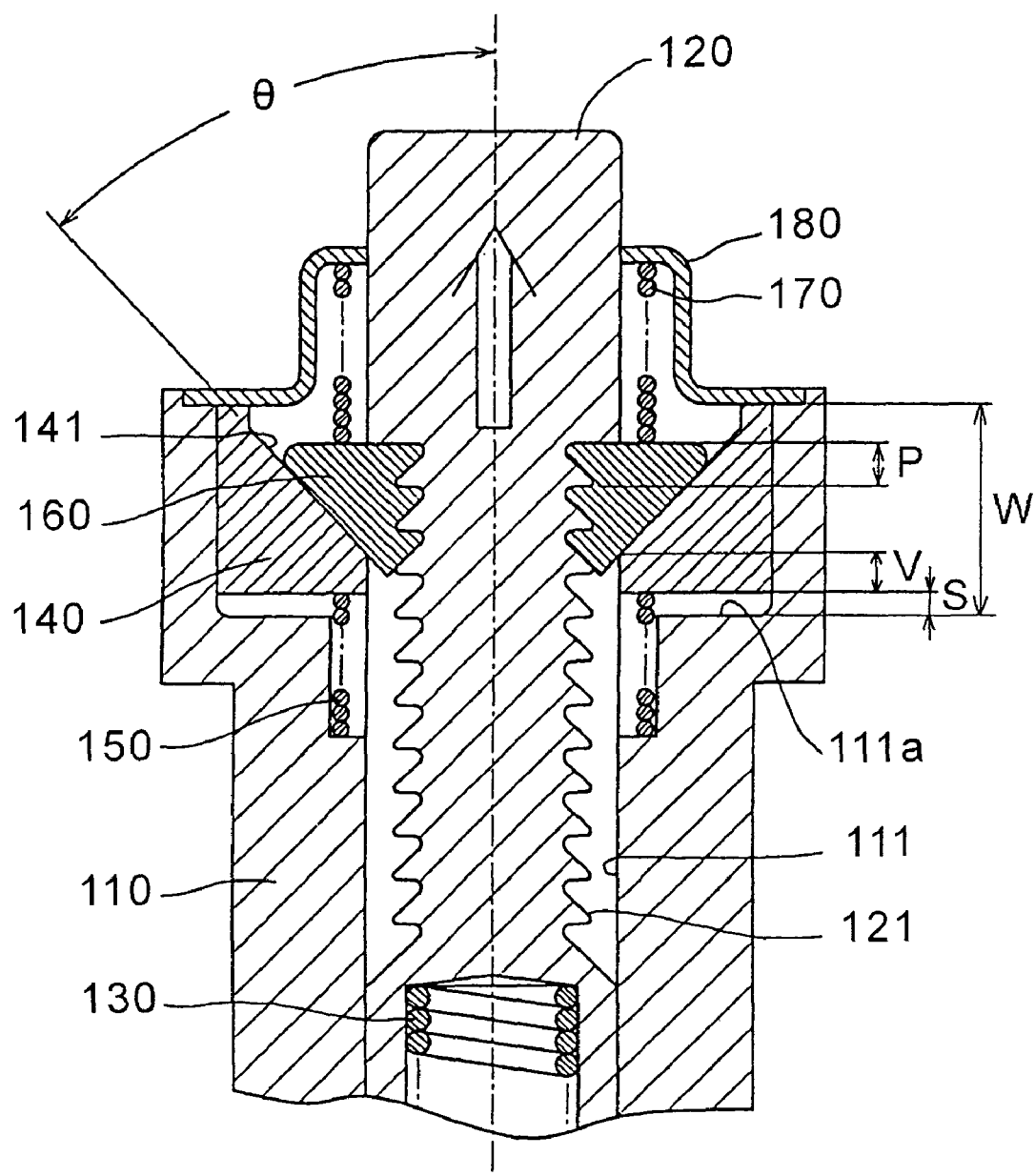
FIG. 4 is an explanatory sectional view showing details of the relationship between the cams, the plunger racks, and the cam-receiving ring.

As shown in FIGS. 2 to 4, the chain tensioner 100 comprises a housing 110, having a plunger-receiving hole 111 into which a plunger 120 is inserted. A protrusion biasing spring 130, biases the plunger 120 in the protruding direction with respect to the housing 110.

The plunger extends through a cam-receiving ring 140, which is disposed in an enlarged part 111a of the plunger-receiving hole 111 at the front end of hole 111. A ring-biasing spring 150 is provided for biasing the cam-receiving ring 140 in the protruding direction, that is, in the direction in which the plunger protrudes from the housing. A pair of wedge-shaped cams 160, slide on sloped cam guide surfaces 141 in grooves formed in the cam-receiving ring 140. The cams have teeth which are engageable with longitudinally extending, toothed racks, formed on opposite sides of the plunger 120. A cam-biasing spring 170 biases the pair of wedge-shaped cams 160 in the retracting direction, i.e, the direction opposite to the protruding direction of the plunger 120. A seal cap 180, having a hole through which the plunger 120 extends, is secured to the front end of the housing, 110, and seals the ring-biasing spring 150, the cam-receiving ring 140, the wedge-shaped cams 160 and the cam-biasing spring 170, within the enlarged part 111a at the front end of the plunger-receiving hole 111. The cam-receiving ring 140 is displaceable axially between the inside end surface of the seal cap 180 and a shoulder in the enlarged part 111a of the plunger-receiving hole 111, being stopped by the shoulder when moving in the retracting direction, and by the inside end surface of the seal cap, when moving in the protruding direction.

In the embodiment shown, the protrusion biasing spring 130 is interposed between the rear end of the plunger 120 and the bottom of the plunger-receiving hole 111. However, as an alternative, the protrusion biasing spring 130 may be positioned elsewhere. For example, it may be interposed between a flange (not shown), which may be provided on the front end of the plunger, and the seal cap. The protrusion-biasing spring 130 can exert a larger biasing force than either the ring-biasing spring 150 or the cam biasing spring 170. Furthermore, the ring-biasing spring 150 can exert a larger biasing force than the cam-biasing spring 170.

Referring to FIG. 4, θ, the angle of inclination of the oblique cam guide surface 141 in the cam-receiving ring 140, is 45°. This allows the cams 160 to slide smoothly in the ascending or descending directions on the cam guide surfaces 141, in accordance with the extending or retracting operation of the plunger 120. The angle θ may be freely set at any angle within the range 15°<θ<70°and the setting determines the plunger's return distance n due to displacement of the cams from the position immediately preceding the position at which the wedge-shaped cams step over one tooth of the racks. The angle θ also determines the plunger's return distance m due to displacement of the cams from its position immediately after the cams have stepped over one tooth of the racks. In each case, the plunger is able to return to a position in which the cams are fully engaged with the racks, and the cam-receiving ring is engaged with the shoulder formed in the enlarged part 111a of hole 111. This position of the plunger is referred to as the "backstopped position." As will be apparent, the number of possible backstopped positions depends on the number of teeth of a rack and the number of teeth in a cam. In the embodiment shown in FIG. 4, the number of possible backstopped positions (10) is the number of teeth of the rack (11) plus two, less the number of teeth on the cam (3).

The rear end of the housing 110 is provided with a hydraulic valve mechanism 190 for causing oil pressure, from an external oil supply (not shown), to act on the rear end of the plunger 120, in order to adjust the protrusion biasing force of the plunger 120 accurately. This hydraulic valve mechanism 190 comprises a ball seat 191 press-fit into a retainer 193, a check ball 192, which is free to abut the ball seat 191, and a retainer 193, which holds the check ball 192. Oil flows freely, through the hydraulic valve mechanism 190, into a high pressure oil chamber 195, formed by the plunger-receiving hole 111 and the rear end of the plunger 120. However the valve mechanism blocks reverse flow of oil from the high pressure oil chamber 195, so that chain tension is accurately maintained by the plunger 120.

As mentioned previously, M may be defined as the minimum backlash distance of the plunger, N may be defined as the maximum backlash distance, S may be defined as the maximum displacement of the cam-receiving ring, n may be defined as the return distance of the plunger due to displacement of the cams from a position immediately preceding the position at which they step over one tooth of the racks, and m may be defined as the return distance of the plunger due to displacement of the cams from a position immediate following the position at which they step over one tooth of the racks. In accordance with the invention, the dimensions of the racks of the plunger, the wedge-shaped cams, and the cam-receiving ring are preferably selected to satisfy the relationships M=m+S and N=n+S.

Accordingly, the maximum backlash distance N and the minimum backlash distance M, which influence the foreign sounds which occur on starting of an engine, can be controlled by changing the depth W (FIG. 4) of the enlarged part 111a of the plunger-receiving hole, or the height of the cam-receiving ring 140, both of which relate to the maximum displacement S of the cam-receiving ring. The depth W of part 111a, and the height of the cam-receiving ring can be easily controlled without changing the inclination of the cam-guiding surfaces and allow the tensioner to be adapted to a wide variety of engines having various properties.

Figure 5:
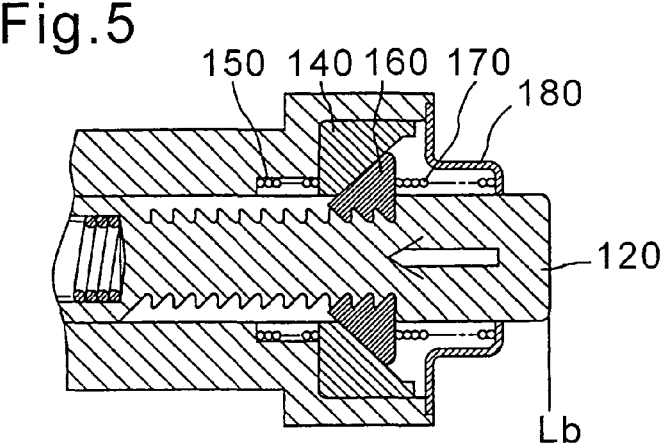
FIG. 5 is a sectional view showing the plunger in its fully retracted position.

Line Lb in FIG. 5 indicates the position of the front end of the plunger 120 when fully retracted. When the timing chain TC loosens, the plunger 120, which is initially in the fully retracted condition depicted in FIG. 5, is immediately moved in the protruding direction by the protrusion biasing spring 130, as shown in FIG. 6.

Figure 6:
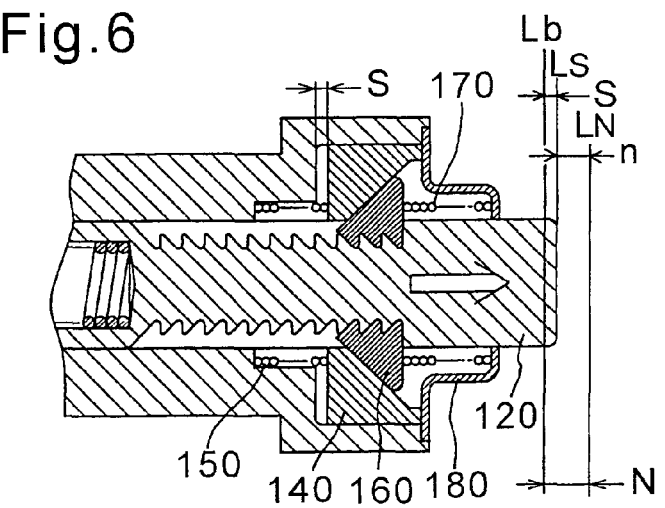
FIG. 6 is a sectional view showing the plunger and cam-receiving ring moved forward to the point at which the begin to move outward to disengage the rack of the plunger.

When the plunger 120 is moved, from a backstopped position in the direction to increase tension in a traveling timing chain TC, the cam-receiving ring 140 is displaced in the protruding direction of the plunger 120 by the biasing force exerted by the ring-biasing spring 150 as shown in FIG. 6. At the same time, the wedge-shaped cams 160, which are biased rearward by the cam-biasing spring 170 and thereby held in full engagement with the rack teeth, are displaced in the protruding direction along with ring 140.

Reference line Lb in FIG. 6 shows a location of the front end of the plunger 120 when in a backstopped position; the reference line Ls shows a location of the front end of the plunger when the cam-receiving ring 140 is displaced in the protruding direction by the maximum displacement distance S; and the reference line LN shows a location of the front end of the plunger 120 just before the cams 160 step over the rack teeth 121 of the plunger 120 by one tooth.

Figure 7:
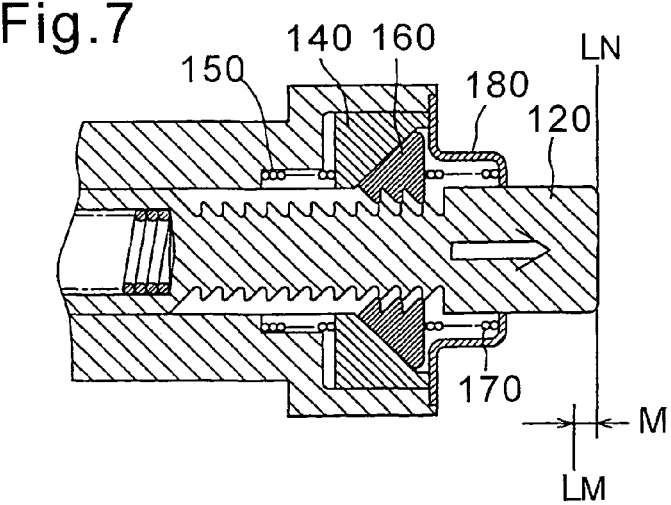
FIG. 7 is a sectional view, showing the plunger moved farther forward to the position just as the cams step over the rack teeth of the plunger by one tooth.

When the cam-receiving ring 140 abuts the seal cap 180, the cams 160 slide outward on the sloping cam guiding surfaces 141 (see FIGS. 3 and 4) until the engagement of the cams with the racks 121 of the plunger is released, as shown in FIG. 7. As the engagement of the cams with the racks is released, the front end position of the plunger 120 is at location LN. Reference line LM shows the position of the front end of the plunger when the plunger is in its new backstopped position after moving forward relative to the cams by one tooth.

Figure 8:
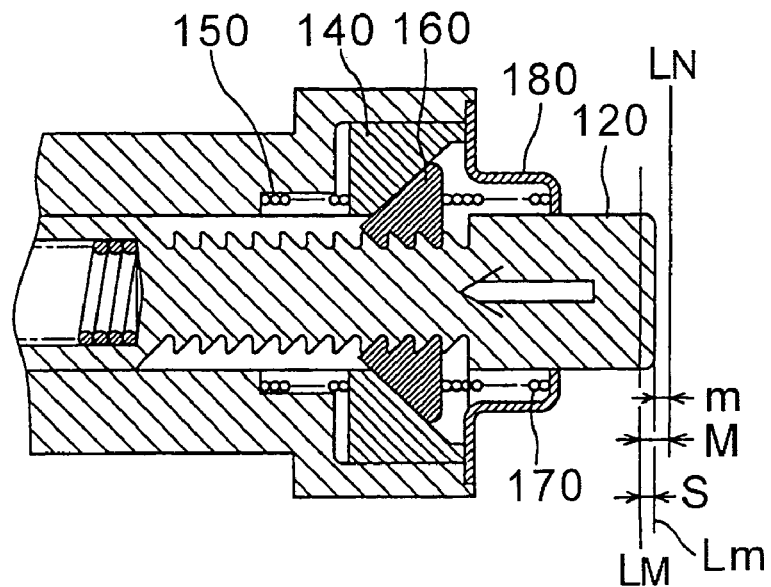
FIG. 8 is a sectional view, showing the cams reengaged with the racks of the plunger, immediately after stepping over the rack teeth by one tooth.

Since the cam-biasing spring 170 is in contact with the seal cap 180, at the moment when the engagement between cams and the racks of the plunger is released, the cams slide inward on the sloping cam-guiding surfaces 141, as shown in FIG. 8, until they become fully engaged with the racks 121 of the plunger 120 but at positions shifted rearward by one tooth on each rack.

When plunger 120 is pushed back by an external force, as shown in FIG. 8, the cams 160 are carried in the retracting direction along with the plunger, and, by virtue of a wedging action, the cams remain engaged with the plunger racks and carry the cam-receiving ring 140 in the retracting direction. The cam-receiving-ring may be pushed in the retracting direction until the it abuts the shoulder surface of the enlarged part 111a of the plunger-receiving hole, whereupon the plunger is stopped at one of its backstopped positions.

Figure 9:
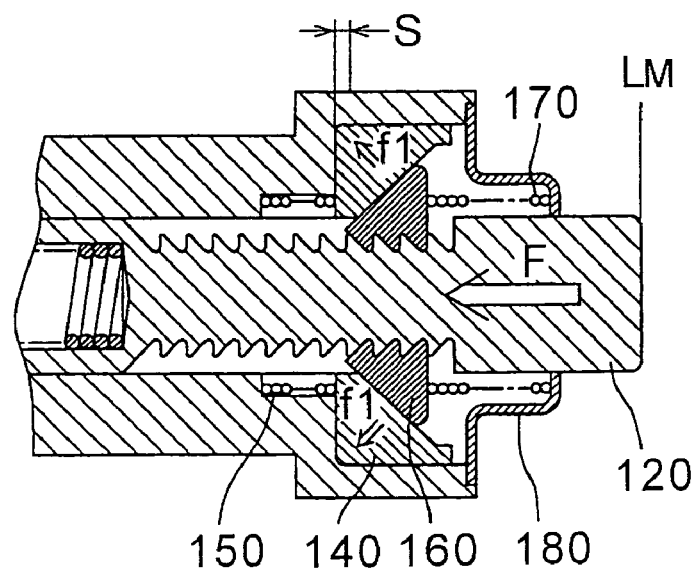
FIG. 9 is a sectional view showing the plunger retracted to a position in which further retraction is prevented by the cams and the cam-receiving ring.
Figure 10:
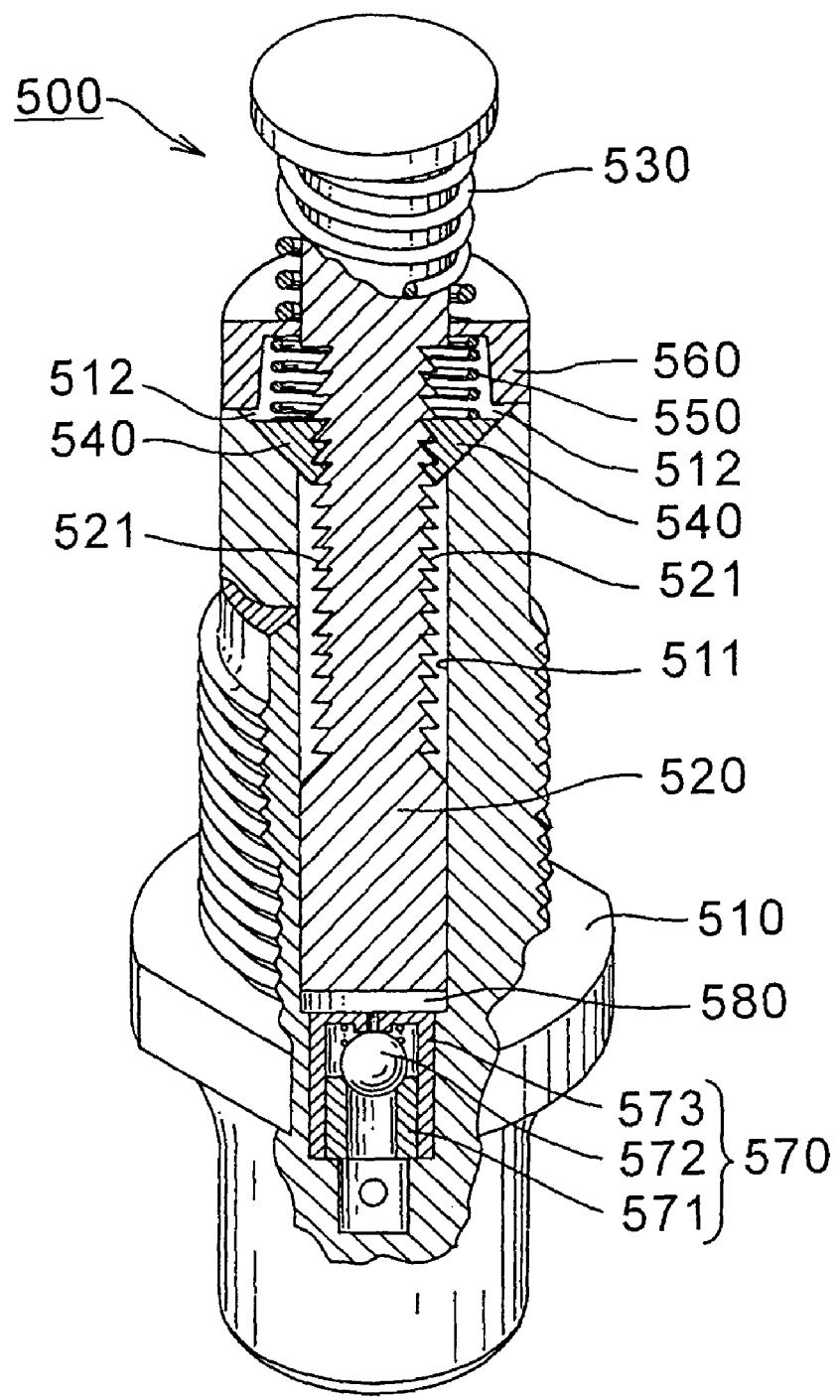
FIG. 10 is a perspective view, partly in section, of a conventional tensioner.

Line LN in FIG. 8 represents the location of the front end of the plunger 120 just as the pair of wedge-shaped cams 160 steps over the rack teeth of the plunger by one tooth, and the line LM represents the position of the front end of the plunger 120 in its backstopped position, as shown in FIG. 9, when the cam-receiving ring 140 is pushed back into engagement with the shoulder surface of the enlarged part 111a of the plunger-receiving hole.

Since the tensioner includes a pair of wedge-shaped cams, which engage two racks on opposite sides of the plunger, when the plunger is in one of its backstopped positions, the axial force F, acting in the retracting direction on the plunger, is divided into two equal oblique components f1 on opposite sides of the plunger, the magnitude of each component being less than the magnitude of the axial force F.

As will be apparent from FIGS. 5–9, the displacement of the cam-receiving ring increases both the minimum and maximum backlash distances of the plunger by the maximum displacement S of the cam-receiving ring. Thus, if the maximum displacement of the plunger relative to the cams, i.e. the maximum relative movement of the plunger and cams without stepping over a rack tooth, is n, and the minimum displacement of the plunger relative to the cams, i.e. the minimum relative movement of the plunger and cams after the cam teeth step over the rack teeth, is m. The maximum backlash distance N is n+S, and the minimum backlash distance M is m+S.

The chain tensioner in accordance with the invention exerts an appropriate backstopping function, and can prevent wobbling sounds, chain noise, and whistling sounds due to excess tensioning of the chain resulting from excessive protrusion of a plunger. Furthermore, the maximum backlash distance N and the minimum backlash distance M for maintaining appropriate chain tension can be easily controlled by changing not only the angle θ of inclination of the cam-guiding surfaces but also the maximum displacement distance S of the cam-receiving ring. Accordingly, the chain tensioner can be made applicable to a wider variety of engines.

In summary, the chain tensioner in accordance with the invention comprises a housing, a plunger biased in a protruding direction, a cam-receiving ring, fitted on the outside of the plunger, and located within front end part of a plunger-receiving hole in the housing, having an increased diameter. A ring-biasing spring biases the cam-receiving ring in the protruding direction of the plunger. Wedge-shaped cams, which slide on a sloping cam guide surface formed in the cam-receiving ring, engage with racks formed on the outer circumference of the plunger. A cam-biasing spring biases the wedge-shaped cams in the retracting direction. A seal cap, through which the plunger extends, seals the ring-biasing spring, the cam-receiving ring, the wedge-shaped cams, and the cam-biasing spring within the increased diameter front end of the plunger-receiving hole. The cam-receiving ring is displaced between the back surface of the seal cap and a shoulder formed in the increased diameter end portion of the plunger-receiving hole. Accordingly, as a chain becomes elongated during engine operation, an appropriate backlash distance is maintained by virtue of the fact that the plunger proceeds in the protruding direction relative to the cams, one tooth at a time. Foreign sounds are prevented, and whistling sounds, generated during excessive tensioning of the chain, are prevented. As a result appropriate chain tension is maintained.

The plunger, the housing, the ring-biasing spring, the cam-receiving ring, the wedge-shaped cams, and the cam-biasing spring are formed so that the maximum backlash distance N and the minimum backlash distance M and the balance therebetween, which influence the above-mentioned foreign sounds which occur on starting of an engine, can be controlled by changing the depth W of the increased diameter portion 111a of the plunger-receiving hole, and/or the height of the cam-receiving ring 140, both of which influence the maximum displacement S of the cam-receiving ring. Thus the maximum and minimum backlash distances can be controlled without depending solely on the angle of inclination of the sloped cam-guiding surfaces, and the chain tensioner can be adapted to a wide variety of engines having various properties.

We claim:

1. A tensioner comprising:
    a housing having a front end, and a plunger-receiving hole formed in said housing, said hole having an opening at said front end of the housing, and said hole having a plunger-receiving part having a first diameter spaced from said front end of the housing and a widened part adjacent said front end of the housing, said widened part having a diameter wider than said first diameter and a shoulder recessed from said front end and facing toward said front end;
    a plunger having a longitudinal axis and slidably fitting into said plunger-receiving hole and protruding axially from the opening thereof in a protruding direction, said plunger having an external surface with longitudinally extending, toothed racks formed thereon;
    a protrusion biasing spring, biasing said plunger in said protruding direction;
    a cam-receiving ring, through which the plunger extends, the cam-receiving ring being located in said widened part of the hole, and having an oblique cam-guiding surface, said guiding surface sloping in the direction of protrusion of the plunger and outward from the axis of the plunger;

a ring-biasing spring, biasing said cam-receiving ring in the direction of protrusion of the plunger;

a plurality of wedge-shaped cams, which slide on the oblique cam-guiding surface of the cam-receiving ring, and engageable with the racks on said plunger;

a cam-biasing spring, biasing said wedge-shaped cams in the direction opposite to said direction of protrusion of the plunger; and a seal cap on said housing, the seal cap having a cap opening through which the plunger extends axially, and cooperating with said widened portion of said hole to provide an enclosure containing said ring-biasing spring, said cam-receiving ring, said wedge-shaped cams, and said cam biasing spring, said seal cap having an inside end surface surrounding said cap opening;

wherein said cam-receiving ring is disposed between said inside end surface of said seal cap and said shoulder, and movable axially therebetween.

2. A chain tensioner according to claim 1, in which when the minimum backlash distance of said plunger is defined as M, the maximum backlash distance of said plunger is defined as N, the maximum displacement of said cam-receiving ring is defined as S, the return distance of the plunger due to displacement of said cams from a position immediately preceding the position at which said cams step over one tooth of the racks is defined as n, and the return distance of the plunger due to displacement of said cams from a position immediate following the position at which said cams step over one tooth of the racks is defined as m, the dimensions of the racks of the plunger, the wedge-shaped cams, and the cam-receiving ring satisfy the relationships $M=m+S$ and $N=n+S$.

* * * * *